United States Patent
Pfeil et al.

(10) Patent No.: US 11,926,566 B2
(45) Date of Patent: Mar. 12, 2024

(54) MULTI-COMPONENT INORGANIC ANCHORING SYSTEM BASED ON ALUMINOUS CEMENT

(71) Applicant: Hilti Aktiengesellschaft, Schaan (LI)

(72) Inventors: Armin Pfeil, Kaufering (DE); Vanessa Sirch, Untermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 450 days.

(21) Appl. No.: 17/283,642

(22) PCT Filed: Oct. 2, 2019

(86) PCT No.: PCT/EP2019/076702
§ 371 (c)(1),
(2) Date: Apr. 8, 2021

(87) PCT Pub. No.: WO2020/074346
PCT Pub. Date: Apr. 16, 2020

(65) Prior Publication Data
US 2021/0387913 A1 Dec. 16, 2021

(30) Foreign Application Priority Data
Oct. 10, 2018 (EP) .................................. 18199488

(51) Int. Cl.
| | | |
|---|---|---|
| C04B 22/14 | (2006.01) | |
| B28B 23/00 | (2006.01) | |
| B28B 23/02 | (2006.01) | |
| C04B 14/28 | (2006.01) | |
| C04B 28/06 | (2006.01) | |
| C04B 40/06 | (2006.01) | |
| E04B 1/41 | (2006.01) | |
| C04B 103/10 | (2006.01) | |
| C04B 103/30 | (2006.01) | |

(52) U.S. Cl.
CPC .......... *C04B 22/147* (2013.01); *B28B 23/005* (2013.01); *B28B 23/02* (2013.01); *C04B 14/28* (2013.01); *C04B 28/06* (2013.01); *C04B 40/0633* (2013.01); *E04B 1/41* (2013.01); *C04B 2103/10* (2013.01); *C04B 2103/30* (2013.01)

(58) Field of Classification Search
CPC ... C04B 22/147; C04B 14/28; C04B 40/0633; C04B 2103/10; C04B 2103/30; B28B 23/005; B28B 23/02; E04B 1/41
USPC ........................................................ 52/699
See application file for complete search history.

(56) References Cited

U.S. PATENT DOCUMENTS

| | | |
|---|---|---|
| 4,352,693 A | 10/1982 | Langdon |
| 2008/0057206 A1* | 3/2008 | Igo ................. C04B 28/146 |
| | | 427/403 |
| 2010/0175589 A1 | 7/2010 | Charpentier et al. |
| 2018/0050963 A1 | 2/2018 | Hesse et al. |
| 2018/0251404 A1 | 9/2018 | Pfeil et al. |
| 2018/0305265 A1 | 10/2018 | Pfeil et al. |
| 2021/0387917 A1 | 12/2021 | Pfeil et al. |

FOREIGN PATENT DOCUMENTS

| | | |
|---|---|---|
| EP | 0 033 246 | 8/1981 |
| FR | 2 918 055 | 1/2009 |
| JP | 10-324848 | 12/1998 |
| WO | 2016/142339 | 9/2016 |
| WO | 2017/067951 | 4/2017 |
| WO | 2018/189295 | 10/2018 |

OTHER PUBLICATIONS

U.S. Office Action dated May 15, 2023, in U.S. Appl. No. 17/283,633, 10 pages.
Liu Ling, "Civil Engineering Materials", $2^{nd}$ edition, Wuhan University Press, Jan. 2018, with English translation, 7 pages.
Shen Chunlin, "Production and construction of ready-mixed mortar", China Building Materials Press, Aug. 2015, with English translation, 9 pages.
International Search Report dated Nov. 19, 2019 in PCT/EP2019/076702, 4 pages.
Written Opinion dated Nov. 19, 2019 in PCT/EP2019/076702, 7 pages.
U.S. Appl. No. 17/283,596, filed Apr. 8, 2021, Pfeil et al.
U.S. Appl. No. 17/283,608, filed Apr. 8, 2021, Pfeil et al.
U.S. Appl. No. 17/283,633, filed Apr. 8, 2021, Pfeil et al.

* cited by examiner

*Primary Examiner* — Mark R Wendell
(74) *Attorney, Agent, or Firm* — Grüneberg and Myers PLLC

(57) ABSTRACT

A multi-component inorganic anchoring system, for chemical fastening of anchors and post-installed reinforcing bars in mineral substrates, includes a curable powdery aluminous cement component A and an initiator component B in an aqueous phase for initiating a curing process. Component A further includes calcium carbonate and component B includes an accelerator constituent and water. The calcium carbonate in component A has an average particle size in the range of from 0.5 to 150 μm. Methods can be utilized for using calcium carbonate having an average particle size in the range of from 0.5 to 150 μm in a multi-component inorganic anchoring system to increase load values. Methods can also be utilized for chemical fastening of anchors, such as metal anchors and post-installed reinforcing bars, in mineral substrates, such as structures made of brickwork, concrete, pervious concrete, or natural stone.

19 Claims, No Drawings

MULTI-COMPONENT INORGANIC ANCHORING SYSTEM BASED ON ALUMINOUS CEMENT

CROSS-REFERENCE TO RELATED APPLICATIONS

This application is a National Stage entry under § 371 of International Application No. PCT/EP2019/076702, filed on Oct. 2, 2019, and which claims the benefit of European Application No. 18199488.0, filed on Oct. 10, 2018. The content of each of these applications is hereby incorporated by reference in their entirety.

FIELD OF THE INVENTION

The present invention pertains to a multi-component inorganic anchoring system for a chemical fastening of anchors and post-installed reinforcing bars in mineral substrates, comprising a curable powdery aluminous cement component A and an initiator component B in aqueous-phase for initiating the curing process, component A further comprising calcium carbonate, and component B comprising an accelerator constituent and water, characterized in that the calcium carbonate comprised in component A has an average particle size in the range of from 0.5 to 150 µm. Moreover, the present invention pertains to a use of calcium carbonate having an average particle size in the range of from 0.5 to 150 µm in a multi-component inorganic anchoring system to increase load values as well as to a method for a chemical fastening of anchoring means, preferably of metal anchors and post-installed reinforcing bars, in mineral substrates, such as structures made of brickwork, concrete, pervious concrete or natural stone.

BACKGROUND OF THE INVENTION

Many mortar systems exist which provide a good chemical fastening of anchors and post-installed reinforcing bars in mineral substrates or surfaces. Predominantly mineral systems based on aluminous cement have been developed. Aluminous cement has as its major constituent monocalcium aluminate and is widely used in the building and construction industries as the final products evidence a high level of mechanical performance over extended periods of time. Also, aluminous cement is resistant to bases and attains its maximum strength more rapidly than Portland cement and is capable of withstanding solutions of sulfates. Hence, aluminous cement systems are preferably employed in the field of chemical anchoring.

When it comes to chemically fastening of anchors and post-installed reinforcing bars in mineral substrates, most of the known systems lack in sufficient fluidity for most practical applications of the resultant anchoring compositions. Moreover, liquid systems or systems in slurry form exist that have to be mixed prior to the introduction into the borehole making application difficult, in particular with respect to overhead or under water applications, as liquid mortar can drop out of the borehole or can liquefy due to the surrounding water or moist. Often such prior art compositions also evidence a tendency to crack in a relatively short time or do not exhibit the required mechanical performance, in particular under certain conditions such as under the influence of elevated temperatures, in different conditioned boreholes as well as over a long period of time. Moreover, known systems tend to exhibit a large extend of shrinkage when applied in a borehole which results in an insufficient anchoring of the anchors and post-installed reinforcing bars.

Therefore, there is a need for an inorganic anchoring system, preferably a multi-component inorganic anchoring system, which is superior over the prior art systems. In particular, it is of interest to provide a system that can be used for a chemical fastening of anchors and post-installed reinforcing bars in mineral substrates without adversely affecting the handling characteristics, in particular with respect to overhead and under water applications, and the mechanical performance of the chemical anchoring system. Especially, there is a need for a system that provides increased load values when compared to the known systems. In addition, there is a need to improve load values by the addition of fillers or particles materials, such as an inorganic-based material, to lower the consumption of more expensive binder material or to improve some properties of the mixed material.

In view of the above, it is an object of the present invention to provide an inorganic anchoring system, preferably a multi-component inorganic anchoring system, in particular a two-component inorganic capsule anchoring system, which has an excellent mechanical performance, also over a long period of time, and at the same time having increased load values when compared to the known systems and which has advantages, in particular with regard to its direct application within the borehole, overhead and under water.

Moreover, it is an object of the present invention to provide a method for a chemical fastening of anchoring means, preferably of metal anchors and post-installed reinforcing bars, in mineral substrates, such as structures made of brickwork, concrete, pervious concrete or natural stone, using this inorganic anchoring system.

These and other objectives as they will become apparent from the ensuring description of the invention are solved by the present invention as described in the embodiments below. The below detailed description includes descriptions of preferred embodiments.

SUMMARY OF THE INVENTION

In one aspect, the present invention pertains to a multi-component inorganic anchoring system comprising a curable powdery aluminous cement component A and an initiator component B in aqueous-phase for initiating the curing process, component A further comprising calcium carbonate, and component B comprising an accelerator constituent and water, which is characterized in that the calcium carbonate comprised in component A has an average particle size in the range of from 0.5 to 150 µm. This provided system is used for chemical fastening of anchoring means in mineral substrates.

In another aspect, the invention pertains to a use of calcium carbonate having an average particle size in the range of from 0.5 to 150 µm in a multi-component inorganic anchoring system for a chemical fastening of anchors and post-installed reinforcing bars in mineral substrates, comprising a curable powdery aluminous cement component A and an initiator component B for initiating the curing process, to increase load values.

Finally, in another aspect, the present invention pertains to a method for a chemical fastening of anchors and post-installed reinforcing bars in mineral substrates, which is characterized in that a multi-component inorganic anchoring system is used for fastening, which comprises a curable powdery aluminous cement component A and an initiator component B for initiating the curing process, component A further comprising calcium carbonate, and component B comprising an accelerator constituent and water, and wherein the calcium carbonate comprised in component A has an average particle size in the range of from 0.5 to 150 µm. The mineral substrates, are substrates such as structures made of brickwork, concrete, pervious concrete or natural stone.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "aluminous cement" in the context of the present invention refers to a calcium aluminate cement that consists predominantly of hydraulic active calcium aluminates. Alternative names are "high-alumina cement" or "Ciment fondu" in French. The main active constituent of calcium aluminate cements is monocalcium aluminate ($CaAl_2O_4$, $CaO \cdot Al_2O_3$, or CA in the cement chemist notation).

The term "initiator" or "initiator component" in the context of the present invention refers to a compound or composition that modifies the chemical environment to start a particular chemical reaction. In the present invention, the initiator starts the curing process in the final mixture.

The term "accelerator constituent" in the context of the present invention refers to a compound or a mixture of compounds that accelerate curing of the final mixture in order to achieve faster setting times.

It has been surprisingly found out by the inventors, that the addition of a calcium carbonate having an average particle size in the range of from 0.5 to 150 µm to an inorganic anchoring system for a chemical fastening of anchors and post-installed reinforcing bars in mineral substrates, comprising a curable powdery aluminous cement component, preferably based on calcium aluminate cement, results in a significant increase of load values when compared to a system not comprising any calcium carbonate having an average particle size in the range of from 0.5 to 150 µm. It has also been found out that the addition of a calcium carbonate having an average particle size in the range of from 0.5 to 150 µm does not adversely affecting the handling, characteristics and the mechanical performance of the chemical anchoring system, especially when applied over a long period of time, under water and overhead.

Moreover, it has been found that the multi-component inorganic anchoring system of the present invention, in particular a two-component inorganic capsule anchoring system, allows for an easy application and fastening directly within the borehole without having to premix the components before introducing them into the borehole and allows for easy under water and overhead applications.

Therefore, the present invention pertains to a multi-component inorganic anchoring system comprising a curable powdery aluminous cement component A and an initiator component B in aqueous-phase for initiating the curing process, component A further comprising calcium carbonate, and component B comprising an accelerator constituent and water, characterized in that the calcium carbonate comprised in component A has an average particle size in the range of from 0.5 to 150 µm.

Component A as used in the present invention is based on an aluminous cement (CA) or a calcium sulfoaluminate cement (CAS). The aluminous cement component which can be used in the present invention is preferably an aluminous cement component based on powdery calcium aluminate cement (CAC). The aluminous cement to be used in the present invention is characterized by rapid set and rapid hardening, rapid drying, excellent resistance to corrosion and shrinkage. Such a calcium aluminate cement suitable to be used in the present invention is for example Ternal® White (Kerneos, France).

If component A comprises a mixture of aluminous cement (CAC) and calcium sulfate ($CaSO_4$), rapid ettringite formation takes place during hydration. In concrete chemistry hexacalcium aluminate trisulfate hydrate, represented by the general formula $(CaO)_6(Al_2O_3)(SO_3)_3 \cdot 32H_2O$ or $(CaO)_3(Al_2O_3)(CaSO_4)_3 \cdot 32H_2O$, is formed by the reaction of calcium aluminate with calcium sulfate, resulting in quick setting and hardening as well as in shrinkage compensation or even expansion. With moderate increase of the sulfate content shrinkage compensation can be achieved.

Component A as used in the present invention comprises at least about 20 wt.-%, preferably at least about 40 wt.-%, more preferably at least about 60 wt.-%, most preferably at least about 70 wt.-%, from about 20 wt.-% to about 95 wt.-%, preferably from about 40 wt.-% to about 85 wt.-%, more preferably from about 60 wt.-% to about 80 wt.-%, most preferably from about 70 wt.-% to about 80 wt.-% of aluminous cement, based on the total weight of component A.

According to an alternative embodiment of the invention, component A as used comprises at least about 20 wt.-%, preferably at least about 30 wt.-%, more preferably at least about 40 wt.-%, most preferably at least about 50 wt.-%, from about 20 wt.-% to about 80 wt.-%, preferably from about 30 wt.-% to about 70 wt.-%, more preferably from about 35 wt.-% to about 60 wt.-%, most preferably from about 40 wt.-% to about 55 wt.-% of aluminous cement, based on the total weight of component A and at least about 5 wt.-%, preferably at least about 10 wt.-%, more preferably at least about 15 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-% of calcium sulfate, preferably calcium sulfate hemihydrate, based on the total weight of component A. In a preferred alternative embodiment of the multi-component inorganic anchoring system of the present invention, the ratio of $CaSO_4$/CAC of component A should be less or equal to 35:65.

The calcium carbonate having an average particle size in the range of from 0.5 to 150 µm of the multi-component inorganic anchoring system for a chemical fastening of anchors and post-installed reinforcing bars in mineral substrates according to the present invention, is preferably in the form of an amorphous or crystalline calcium carbonate or a mixture thereof. In particular, the calcium carbonate having an average particle size in the range of from 0.5 to 150 µm used is precipitated, grinded and/or synthetically modified having a high BET. In a preferred embodiment of the present invention the calcium carbonate used is in the form of calcium carbonate having a BET>20 m²/g.

In a particular preferred embodiment, the calcium carbonate used has an average particle size (d50%) in the range of from 0.5 to 50 µm, more preferably of from 0.6 to 10 µm, most preferably has an average particle size of 0.7 μm. In an alternative embodiment, the calcium carbonate used has an average particle size of 2.4 μm.

The calcium carbonate or calcium carbonates used in the present invention are commercially available calcium carbonates, such for example Omyacarb® types from Omya International AG, Germany, or any other calcium carbonates having an average particle size in the range of from 0.5 to 150 μm.

The calcium carbonate having an average particle size in the range of from 0.5 to 150 μm used according to the present invention, is comprised in the powdery aluminous cement component A of the multi-component inorganic anchoring system. The addition of calcium carbonate having an average particle size in the range of from 0.5 to 150 μm to the inorganic anchoring system, lowers the consumption of more expensive binder material and improves some properties of the mixed material, especially results in an increase of load values and eases under water and overhead applications, especially when the multi-component inorganic anchoring system is in form of a two-component inorganic capsule anchoring system.

Component A of the present invention comprises at least about 5 wt.-%, preferably at least about 10 wt.-%, more preferably at least about 20 wt.-%, most preferably at least about 30 wt.-%, from about 5 wt.-% to about 60 wt.-%, preferably from about 10 wt.-% to about 50 wt.-%, more preferably from about 15 wt.-% to about 40 wt.-%, most preferably from about 20 wt.-% to about 35 wt.-% of calcium carbonate having an average particle size in the range of from 0.5 to 150 μm, based on the total weight of component A.

It is particular preferred that the calcium carbonate having an average particle size of 2.4 μm is present in the range of from about 1 wt.-% to 35 wt.-%, preferably from about 5 wt.-% to 30 wt.-%, more preferably from about 10 wt.-% to 30 wt.-%, most preferably from about 15 wt.-% to 30 wt.-%, based on the total weight of component A. In an alternative embodiment, the calcium carbonate having an average particle size of 0.7 μm is present in the range of from about 1 wt.-% to 35 wt.-%, preferably from about 5 wt.-% to 30 wt.-%, more preferably from about 10 wt.-% to 30 wt.-%, most preferably from about 15 wt.-% to 30 wt.-%, based on the total weight of component A.

In an advantageous embodiment, component A as used in the present invention may further comprise the following characteristics, taken alone or in combination.

Component A may further comprise an antibacterial or biocidal agent in powder form. The antibacterial or biocidal agents which can be used in the present invention may be selected from the group consisting of compounds of the isothiazolinone family, such as methylisothiazolinone (MIT), octylisothiazolinone (OIT) and benzoisothiazolinone (BIT) and their mixtures.

Component A may further comprise an additional filler, in particular an inorganic or mineral filler. The filler which can be used in the present invention may be selected from the group consisting of coarse quartz, quartz powder, preferably quartz powder having an averaged grain size (d50%) of about 16 μm, quartz sand, clay, fly ash, fumed silica, carbonate compounds, aluminas, pigments, titanium oxides, light fillers, corundum, and their mixtures. Suitable mineral fillers are commercially available products. Exemplarily mentioned is quartz powder Millisil W12 or W6 (Quarzwerke GmbH, Germany), quartz sand F32 (Quarzwerke GmbH, Germany), or Sewper Aggregates, such as SewperCoat® (Kerneos S.A., France). Component A may comprise at least about 1 wt.-%, preferably at least about 2 wt.-%, more preferably at least about 5 wt.-%, most preferably at least about 8 wt.-%, from about 1 wt.-% to about 50 wt.-%, preferably from about 2 wt.-% to about 40 wt.-%, more preferably from about 5 wt.-% to about 30 wt.-%, most preferably from about 8 wt.-% to about 25 wt.-% of said at least one filler, based on the total weight of component A.

Component A may additionally comprise a thickening agent in powder form. The thickening agents which can be used in the present invention may be selected from the group consisting of organic products, such as xanthan gum, welan gum or DIUTAN® gum (CPKelko, USA), starched-derived ethers, guar-derived ethers, cellulose-derived ethers, polyacrylamide, carrageenan, agar agar, and mineral products, such as clay, and their mixtures. Suitable thickening agents are commercially available products. Component A comprises at least about 0.01 wt.-%, preferably at least about 0.1 wt.-%, more preferably at least about 0.2 wt.-%, most preferably at least about 0.3 wt.-%, from about 0.01 wt.-% to about 10 wt.-%, preferably from about 0.1 wt.-% to about 5 wt.-%, more preferably from about 0.2 wt.-% to about 1 wt.-%, most preferably from about 0.3 wt.-% to about 0.7 wt.-% of said thickening agent, based on the total weight of component A.

Component A may also additionally comprise a plasticizer in powder form. The plasticizer comprised in component A may be selected from the group consisting of low molecular weight (LMW) polyacrylic acid polymers, polycondensates, like e.g. sulfonated melamine formaldehydes, lingosulfonates, caseins, superplasticizers from the family of polyphosphonate polyox and polycarbonate polyox, and superplasticizers from the polycarboxylate ether family, and mixtures thereof, for example Ethacryl™ G (Coatex, Arkema Group, France), Acumer™ 1051 (Rohm and Haas, U.K.), Sika® ViscoCrete®-2520 (Sika, Germany) or Sika® ViscoCrete®-20 HE (Sika, Germany). Suitable plasticizers are commercially available products. Component A may comprise at least about 0.2 wt.-%, preferably at least about 0.3 wt.-%, more preferably at least about 0.4 wt.-%, most preferably at least about 0.5 wt.-%, from about 0.2 wt.-% to about 20 wt.-%, preferably from about 0.3 wt.-% to about 15 wt.-%, more preferably from about 0.4 wt.-% to about 10 wt.-%, most preferably from about 0.5 wt.-% to about 8 wt.-% of said plasticizer, based on the total weight of component A.

Also, component A may comprise dispersing agents in powder form.

The presence of an antibacterial or biocidal agent, plasticizer, thickening agent and/or dispersing agents in powder form does not change the overall inorganic nature of the cementitious component A.

Component B as used in the present invention comprises an accelerator constituent and water.

The accelerator constituent is comprised of at least one alkali and/or earth alkaline metal salt selected from the group consisting of hydroxides, chlorides, sulfates, phosphates, monohydrogen phosphates, dihydrogen phosphates, nitrates, carbonates and mixtures thereof, preferably the accelerator component is an alkali or earth alkaline metal salt, still preferably is a water-soluble alkali or earth alkaline metal salt, more preferably is a calcium metal salt, such as calcium hydroxide, calcium sulfate, calcium carbonate, calcium chloride, calcium formate or calcium phosphate, a sodium metal salt, such as sodium hydroxide, sodium sulfate, sodium carbonate, sodium chloride, sodium formate or sodium phosphate, or a lithium metal salt, such as lithium hydroxide, lithium sulfate, lithium sulfate monohydrate, lithium carbonate, lithium chloride, lithium formate, lithium citrate, or lithium phosphate, most preferably is lithium sulfate or lithium sulfate monohydrate, or mixtures thereof. Component B comprises at least about 0.01 wt.-%, preferably at least about 0.05 wt.-%, more preferably at least about 0.1 wt.-%, most preferably at least about 1.0 wt.-%, from about 0.01 wt.-% to about 30 wt.-%, preferably from about 0.05 wt.-% to about 20 wt.-%, more preferably from about 0.1 wt.-% to about 15 wt.-%, most preferably from about 1.0 wt.-% to about 13 wt.-% of said accelerator, based on the total weight of component B.

Component B may further comprise a retarder, plasticizer and/or a carbonate-source in liquid form, such as lithium carbonate.

The retarder comprised in component B of the present invention is selected from the group consisting of citric acid, tartaric acid, lactic acid, salicylic acid, gluconic acid and mixtures thereof, preferably is a mixture of citric acid and tartaric acid. Component B comprises at least about 0.1 wt.-%, preferably at least about 0.2 wt.-%, more preferably at least about 0.5 wt.-%, most preferably at least about 1.0 wt.-%, from about 0.1 wt.-% to about 25 wt.-%, preferably from about 0.2 wt.-% to about 15 wt.-%, more preferably from about 0.5 wt.-% to about 15 wt.-%, most preferably from about 1.0 wt.-% to about 10 wt.-% of said retarder, based on the total weight of component B.

The plasticizer comprised in component B of the present invention is selected from the group consisting of low molecular weight (LMW) polyacrylic acid polymers, polycondensates, like e.g. sulfonated melamine formaldehydes, lingosulfonates, caseins, superplasticizers from the family of polyphosphonate polyox and polycarbonate polyox, and superplasticizers from the polycarboxylate ether family, and mixtures thereof, for example Ethacryl™ G (Coatex, Arkema Group, France), Acumer™ 1051 (Rohm and Haas, U.K.), Sika® ViscoCrete®-2520 (Sika, Germany) or Sika® ViscoCrete®-20 HE (Sika, Germany). Suitable plasticizers are commercially available products. Component A comprises at least about 0.2 wt.-%, preferably at least about 0.3 wt.-%, more preferably at least about 0.4 wt.-%, most preferably at least about 0.5 wt.-%, from about 0.2 wt.-% to about 20 wt.-%, preferably from about 0.3 wt.-% to about 15 wt.-%, more preferably from about 0.4 wt.-% to about 10 wt.-%, most preferably from about 0.5 wt.-% to about 8 wt.-% of said plasticizer, based on the total weight of component B.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B comprises at least about 0.01 wt.-%, preferably at least about 0.05 wt.-%, more preferably at least about 0.1 wt.-%, most preferably at least about 0.2 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.2 wt.-% to about 1 wt.-% of said thickening agent, based on the total weight of component B.

The presence of a retarder, plasticizer, thickening agent and/or a carbonate-source in liquid form does not change the overall inorganic nature of the component B.

Component B is present in aqueous phase, preferably in form of a liquid. In an alternative embodiment, component B may also be present in form of a slurry or paste.

The weight ratio between component A and component B (NB) is preferentially comprised between 7/1 and 1/3, preferably is 3/1. Preferably, the composition of the mixture comprises 75 wt.-% of component A and 25 wt.-% of component B. In an alternative embodiment, the composition of the mixture comprises 25 wt.-% of component A and 75 wt.-% of component B.

In a particular preferred embodiment, component A comprises or consists of the following components:
50 wt.-% to 90 wt.-% of calcium aluminate cement,
10 wt.-% to 50 wt.-% of calcium carbonate having an average particle size in the range of from 0.5 to 150 µm.

In a particular preferred embodiment, component B comprises or consists of the following components:
0.1 wt.-% to 20 wt.-% of lithium sulfate,
1 wt.-% to 10 wt.-% of plasticizer, and
70 wt.-% to 99 wt.-% of water.

It is preferred that the multi-component inorganic anchoring system has an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

In the multi-component inorganic anchoring system, especially the two-component inorganic capsule anchoring system, the volume ratio of cementitious component A to component B is 1:1 to 7:1, preferably is 3:1. In an alternative embodiment, the volume ratio of cementitious component A to component B is 1:3 to 1:2.

The multi-component inorganic anchoring system is preferably a ready-for-use system, whereby component A and B are in a multi-chamber device, such as a multi-chamber cartridge, a multi-chamber cylinder and/or a multi-chamber capsule, preferably a two-component capsule. In particular, the two-component inorganic capsule anchoring system includes two foil bags for separating curable component A and initiator component B. In an alternative embodiment, the two-component inorganic capsule is made of glass or paper. The two-component inorganic capsule can also be referred to as capsule-in-capsule, foil-in-foil or glass-in-glass. The contents of the capsule are mixed together by inserting the inorganic anchoring system into the borehole, introducing the anchoring device thereby destroying the capsule and mixing component A and B directly within the borehole ready for setting and chemically fastening the anchoring means.

In particular, the multi-component inorganic anchoring system is to be considered as a chemical anchor for fastening metal anchors and post-installed reinforcing bars.

The multi-component inorganic anchoring system comprising the calcium carbonate having an average particle size in the range of from 0.5 to 150 µm can be used for a chemical fastening of anchoring means, preferably of metal anchors and post-installed reinforcing bars, such as anchor rods, in particular threaded rods, bolts, steel reinforcement bars or the like into mineral substrates, such as structures made of brickwork, concrete, pervious concrete or natural stone. In particular, the multi-component inorganic anchoring system can be used for a chemical fastening of anchoring means, such as metal anchors and post-installed reinforcing bars, in boreholes. It has been found out, that the use of calcium carbonate having an average particle size in the range of from 0.5 to 150 μm in such a multi-component inorganic anchoring system significantly increases the load values and hence load capacity in boreholes.

Hence, the use of calcium carbonate having an average particle size in the range of from 0.5 to 150 μm according to the present invention, in addition to any optional mineral fillers present in the multi-component inorganic anchoring system, is particular to increase load values. Moreover, the addition of calcium carbonate having an average particle size in the range of from 0.5 to 150 μm, is advantageous to lower the consumption of more expensive binder material or to improve some properties of the mixed material.

The calcium carbonate having an average particle size in the range of from 0.5 to 150 μm comprised in the multi-component inorganic anchoring system is particularly applied in a method for a chemical fastening of anchoring means, preferably of metal anchors and post-installed reinforcing bars, in mineral substrates, such as structures made of brickwork, concrete, pervious concrete or natural stone.

Moreover, the multi-component inorganic anchoring system comprising the calcium carbonate having an average particle size in the range of from 0.5 to 150 μm may be used for the attachment of fibers, scrims, fabrics or composites, in particular of high-modulus fibers, preferably of carbon fibers, in particular for the reinforcement of building structures, for example walls or ceilings or floors, or further for mounting components, such as plates or blocks, e.g. made of stone, glass or plastic, on buildings or structural elements. However, in particular it is used for fastening of anchoring means, preferably metal anchors and post-installed reinforcing bars, such as anchor rods, in particular threaded rods, bolts, steel reinforcement bars or the like into recesses, such as boreholes, in mineral substrates, such as structures made of brickwork, concrete, pervious concrete or natural stone, whereby the components of the multi-component inorganic anchoring system are mixed, for example by destroying a cartridge, capsule or a plastic bag, or by mixing components of a multi-chamber pails or sets of buckets.

The inventive multi-component inorganic anchoring system preferably is contained separately in a two-chamber capsule so as to inhibit reaction and can be caused to react under use conditions. Moreover, the component A and the component B are produced separately from each other, so that the one component usually contains the curable powdery aluminous cement and the calcium carbonate having an average particle size in the range of from 0.5 to 150 μm while the other component contains the initiator component B including the accelerator constituent and water. The fillers, as well as the remaining components, may be contained in the one or also the other component. It is also possible that the accelerator constituent is contained in powder form in component A.

The two-chamber and multi-chamber systems, in which the inventive, multi-component inorganic anchoring system is present, include especially cartridges of glass, plastic, plastic sheets or ceramic, in the interior of which the curable component is kept separate from the initiator component agent by walls, which can be destroyed. Such cartridge or capsule systems are placed in the boreholes. To initiate the curing reaction, the cartridges or capsules, including the partitions contained therein, are destroyed, for example, by driving anchoring means, such as the tie bar, into them.

The following example illustrates the invention without thereby limiting it.

EXAMPLES

1. Preparation of Component a and Component B

The powdery cementitious component A as well as the liquid initiator component B of the comparative example 1 and of inventive examples 2 to 33 are initially produced by mixing the constituents specified in Tables 1 and 3, respectively. The proportions that are given are expressed in wt.-%.

TABLE 1

Composition of powder component A.

| | Constituent | | | | | | | |
|---|---|---|---|---|---|---|---|---|
| Sample | Aluminate cement Ternal White | Calcium carbonate Omyacarb 130 AL | Calcium carbonate Omyacarb 15 H AL | Calcium carbonate Omyacarb 2 AL | Calcium carbonate OmyaBrite | Calcium carbonate Calopake F | Calcium carbonate CalPlex Extra | Calcium carbonate Calcilit Super G |
| A0 | 100 | — | — | — | — | — | — | — |
| A1 | 90.9 | 9.1 | — | — | — | — | — | — |
| A2 | 83.3 | 16.7 | — | — | — | — | — | — |
| A3 | 76.9 | 23.1 | — | — | — | — | — | — |
| A4 | 71.4 | 28.6 | — | — | — | — | — | — |
| A5 | 90.9 | — | 9.1 | — | — | — | — | — |
| A6 | 83.3 | — | 16.7 | — | — | — | — | — |
| A7 | 76.9 | — | 23.1 | — | — | — | — | — |
| A8 | 71.4 | — | 28.6 | — | — | — | — | — |
| A9 | 90.9 | — | — | 9.1 | — | — | — | — |
| A10 | 83.3 | — | — | 16.7 | — | — | — | — |
| A11 | 76.9 | — | — | 23.1 | — | — | — | — |
| A12 | 71.4 | — | — | 28.6 | — | — | — | — |
| A13 | 90.9 | — | — | — | 9.1 | — | — | — |
| A14 | 83.3 | — | — | — | 16.7 | — | — | — |
| A15 | 76.9 | — | — | — | 23.1 | — | — | — |
| A16 | 71.4 | — | — | — | 28.6 | — | — | — |
| A17 | 90.9 | — | — | — | — | 9.1 | — | — |

TABLE 1-continued

Composition of powder component A.

| Sample | Aluminate cement Ternal White | Calcium carbonate Omyacarb 130 AL | Calcium carbonate Omyacarb 15 H AL | Calcium carbonate Omyacarb 2 AL | Calcium carbonate OmyaBrite | Calcium carbonate Calopake F | Calcium carbonate CalPlex Extra | Calcium carbonate Calcilit Super G |
|---|---|---|---|---|---|---|---|---|
| A18 | 83.3 | — | — | — | — | 16.7 | — | — |
| A19 | 76.9 | — | — | — | — | 23.1 | — | — |
| A20 | 71.4 | — | — | — | — | 28.6 | — | — |
| A21 | 90.9 | — | — | — | — | — | 9.1 | — |
| A22 | 83.3 | — | — | — | — | — | 16.7 | — |
| A23 | 76.9 | — | — | — | — | — | 23.1 | — |
| A24 | 71.4 | — | — | — | — | — | 28.6 | — |
| A25 | 90.9 | — | — | — | — | — | — | 9.1 |
| A26 | 83.3 | — | — | — | — | — | — | 16.7 |
| A27 | 76.9 | — | — | — | — | — | — | 23.1 |
| A28 | 71.4 | — | — | — | — | — | — | 28.6 |
| A29 | 66.7 | — | — | — | — | — | — | 33.3 |
| A30 | 62.5 | — | — | — | — | — | — | 37.5 |
| A31 | 58.8 | — | — | — | — | — | — | 41.2 |
| A32 | 55.5 | — | — | — | — | — | — | 44.5 |

Ternal White ® marketed by Kerneos S.A., France
Omyacarb 130 AL/Omyacarb 15 H AL/Omyacarb 2 AL/OmyaBrite marketed by Omya International AG, Switzerland
Calopake F marketed by Speciality Minerals Lifford, UK
CalPlex Extra marketed by Calcit d.o.o., Slovenia
Calcilit Super G markted by Alpha Calcit Füllstoff GmbH & Co. KG, Germany

TABLE 2

Fineness of Constituents.

| Constituent | Average Particle Size d50 in μm |
|---|---|
| Ternal White | 21.7 |
| Omyacarb 130 AL | 130 |
| Omyacarb 15 H AL | 8.2 |
| Omyacarb 2 AL | 3.2 |
| OmyaBrite | 2.4 |
| Calopake F | 2 |
| CalPlex Extra | 0.8 |
| Calcilit Super G | 0.7 |

A typical mixing protocol for component B is as follows: dissolving lithium sulfate monohydrate in deionized water on a stirring plate and fully homogenizing it at 500 rpm; finally adding plasticizer whilst stirring, and continuing homogenizing at 500 rpm for 5 min.

TABLE 3

Composition of liquid component B.

| Constituent | Function | Sample B |
|---|---|---|
| Deionized Water | Liquid carrier | 78.96 |
| Visco Crete 2520 | Plasticizer | 7.70 |
| Lithium sulfate monohydrate | Accelerator | 13.34 |

Lithium sulfate monohydrate marketed by Alfa Aesar GmbH & Co. KG, Germany
Visco Crete 2520 marketed by Sika Deutschland GmbH, Germany 2. Determination of Mechanical Performance After being produced separately, the powdery cementitious component A and initiator component B are mixed in a speed mixer. All samples are mixed with a constant w/c-ratio of 0.3. The mixtures are casted into a stainless steel sleeve borehole having a diameter of 12 mm, an anchoring depth of 32 mm and ground undercuts of 0.33 mm. Immediately after filling, an M8 threaded anchor rod with a length of 100 mm is introduced into the borehole. The value loads of the cured mortar compositions are determined after a curing time of 24 hours by using a device for testing materials "Zwick Roell Z050" (Zwick GmbH & Co. KG, Ulm, Germany). The stainless steel sleeve is fastened on a plate while the threaded anchor rod is fixed to the force-measuring device with a nut. With a preload of 500 N and a testing rate of 3 mm/min the failure load is determined by centrally pulling out the threaded anchor rod. Each sample consists of a mean value of five pull-outs. Ultimate failure loads are calculated as inner strengths and given in N/mm$^2$ in Table 4.

TABLE 4

Inner strengths in N/mm$^2$.

| Example No. | Sample number | Inner strength in N/mm$^2$ |
|---|---|---|
| Comparative 1 | A0 + B | 6.0 |
| 2 | A1 + B | 6.8 |
| 3 | A2 + B | 7.3 |
| 4 | A3 + B | 7.7 |
| 5 | A4 + B | 7.7 |
| 6 | A5 + B | 7.4 |
| 7 | A6 + B | 8.0 |
| 8 | A7 + B | 8.9 |
| 9 | A8 + B | 7.7 |
| 10 | A9 + B | 7.6 |
| 11 | A10 + B | 8.2 |
| 12 | A11 + B | 8.2 |
| 13 | A12 + B | 9.3 |
| 14 | A13 + B | 8.2 |
| 15 | A14 + B | 8.4 |
| 16 | A15 + B | c.n.b.d. |
| 17 | A16 + B | c.n.b.d. |
| 18 | A17 + B | 8.3 |
| 19 | A18 + B | 8.0 |
| 20 | A19 + B | 6.8 |
| 21 | A20 + B | c.n.b.d. |
| 22 | A21 + B | 7.5 |
| 23 | A22 + B | 8.3 |
| 24 | A23 + B | 7.8 |
| 25 | A24 + B | 8.5 |
| 26 | A25 + B | 8.5 |
| 27 | A26 + B | 10.3 |

TABLE 4-continued

Inner strengths in N/mm².

| Example No. | Sample number | Inner strength in N/mm² |
|---|---|---|
| 28 | A27 + B | 11.0 |
| 29 | A28 + B | 12.4 |
| 30 | A29 + B | 11.3 |
| 31 | A30 + B | 11.5 |
| 32 | A31 + B | 9.5 |
| 33 | A32 + B | 7.7 | c.n.b.d. = could not be determined

As it can be seen from Table 4, all inventive systems show considerable inner strengths after 24 hours of curing as well as increased load values and hence, improved mechanical strength means, in comparison to the comparative system without calcium carbonate.

As it has been shown above, the use of calcium carbonate of the present invention, in particular with an average particle size in the range of 0.5 to 150 μm as well as when added in an amount in the range of about 10 to 30 wt.-%, provides for an increase in load values and hence mechanical strength when compared to systems not comprising any calcium carbonate. Moreover, the performance improves significantly in boreholes when high load values are desired. Furthermore, it was found that the inventive systems comprising calcium carbonate having an average particle size in the range of from 0.5 to 150 μm do not show any microcracks after curing. Hence, the inventive systems provide for a dense, sealed anchoring system which is an important pre-condition for obtaining improved corrosion and freeze-thaw resistance as well as provide for high load values.

The multi-component inorganic anchoring system has an excellent mechanical performance, also over a long period of time, and at the same time has increased load values when compared to the known systems and which has advantages, in particular with regard to its direct application within the borehole, under water and overhead.

As it has been shown above, the addition of calcium carbonate having an average particle size in the range of from 0.5 to 150 μm, results in an increase of load values and at the same time lowers the consumption of more expensive binder material and improves some properties of the mixed material.

The invention claimed is:

1. A multi-component inorganic anchoring system, comprising:
    a curable powdery aluminous cement component A and an initiator component B in an aqueous-phase for initiating a curing process,
    wherein component A further comprises calcium carbonate, and
    component B comprises an accelerator and water,
    wherein the calcium carbonate in component A has an average particle size in a range of from 0.5 to 150 μm, and
    wherein component A comprises 9.1 to 50% weight percent of the calcium carbonate and at least 60 weight percent of the aluminous cement.

2. The multi-component inorganic anchoring system according to claim 1, wherein the calcium carbonate in component A is present in a range of from 9.1 wt.-% to 35 wt.-%, based on total weight of component A.

3. The multi-component inorganic anchoring system according to claim 1, wherein the accelerator in component B is present in a range of from about 0.01 wt.-% to 30 wt.-%, based on total weight of component B.

4. The multi-component inorganic anchoring system according to claim 1, wherein initiator component B further comprises a plasticizer.

5. The multi-component inorganic anchoring system according to claim 1, wherein component A further comprises an additional filler.

6. The multi-component inorganic anchoring system according to claim 1, wherein component B further comprises a carbonate-source in liquid form.

7. The multi-component inorganic anchoring system according to claim 1, wherein the multi-component inorganic anchoring system is a two-component inorganic capsule anchoring system.

8. The multi-component inorganic anchoring system according to claim 1, wherein the powdery aluminous cement component A is an aluminous cement component comprising powdery calcium aluminate cement.

9. The multi-component inorganic anchoring system according to claim 1, wherein the calcium carbonate in component A has an average particle size in a range of from 0.5 to 10 μm.

10. A method of chemical fastening, comprising:
    chemical fastening of an anchoring means in a mineral substrate with the multi-component inorganic anchoring system according to claim 1.

11. A method of chemical fastening to increase load values, the method comprising:
    chemical fastening of an anchor or post-installed reinforcing bar in a mineral substrate with calcium carbonate having an average particle size in a range of from 0.5 to 150 μm in a multi-component inorganic anchoring system,
    wherein the multi-component inorganic anchoring system comprises a curable powdery aluminous cement component A and an initiator component B for initiating a curing process, wherein the multi-component inorganic anchoring system provides increased load values compared to a multi-component anchoring system not having said calcium carbonate having said average particle size, and
    wherein component A comprises 9.1 to 50% weight percent of the calcium carbonate and at least 60 weight percent of the aluminous cement.

12. The method according to claim 11, wherein component B further comprises an accelerator and water.

13. The method according to claim 11, wherein component B further comprises a plasticizer.

14. The method according to claim 11, wherein the aluminous cement component A is an aluminous cement component comprising powdery calcium aluminate cement.

15. A method for chemical fastening of anchors and post-installed reinforcing bars in mineral substrates, the method comprising:
    fastening of an anchor or post-installed reinforcing bar in a mineral substrate with a multi-component inorganic anchoring system which comprises a curable powdery aluminous cement component A and an initiator component B for initiating a curing process,
    wherein component A further comprises calcium carbonate, and component B comprises an accelerator and water, and
    wherein the calcium carbonate in component A has an average particle size in a range of from 0.5 to 150 μm, and wherein component A comprises 9.1 to 50% weight percent of the calcium carbonate and at least 60 weight percent of the aluminous cement.

16. The method according to claim 15, wherein the multi-component inorganic anchoring system is a two-component inorganic capsule anchoring system.

17. The multi-component inorganic anchoring system according to claim 1, which is cured.

18. An anchor or post-installed reinforcing bar fastened in a mineral substrate with a multi-component inorganic anchoring system according to claim 1, wherein the multi-component inorganic anchoring system is cured.

19. An anchor or post-installed reinforcing bar fastened in a mineral substrate according to claim 18, wherein the mineral substrate comprises brickwork, concrete, pervious concrete or natural stone.

* * * * *